United States Patent Office 3,829,358
Patented Aug. 13, 1974

3,829,358
GROUNDWOOD PULP BLEACHING WITH SODIUM HYDROSULFITE CONTAINING DIGLYCOLATES
Leonard C. Ellis, Chesapeake, and Mearl A. Kise, Portsmouth, Va., assignors to Virginia Chemicals Inc., Portsmouth, Va.
No Drawing. Filed July 11, 1972, Ser. No. 270,690
Int. Cl. D21c 9/10
U.S. Cl. 162—71                                4 Claims

ABSTRACT OF THE DISCLOSURE

A groundwood pulp slurry is bleached with an aqueous solution of sodium hydrosulfite and a salt of diglycolic acid while maintaining the pH of the slurry between 4.1 and 6.3.

BACKGROUND OF THE INVENTION

The widespread use of the metal hydrosulfites in bleaching of pulp for the paper industry, gives rise to problems of economic and environmental impact. To preserve the hydrosulfite bleaching agent against decomposition during the bleaching, while at the same time avoiding the creation of a polluting waste effluent, is essentially the problem faced by the paper industry today.

As is known, eutrophication is a process characterized by an abundant accumulation of nutrients, such as carbon, nitrogen and phosphorus, in lakes and rivers that support a dense growth of algae and floating algae scums. The algae growths are odorous, clog filter treatment plants, and decay during the summer through an aerobic process which depletes the shallow waters of oxygen. Factors in the eutrophication of such waters are natural runoff, agricultural drainage, groundwater, sewage and waste effluents. It has been speculated that phosphorus and nitrogen-containing components, especially in detergents, are major contributors to the eutrophication process. In groundwood pulp bleaching, one of the most effective agents in use today is sodium hydrosulfite, which being difficult to stabilize against decomposition, generally has required substantial phosphate additions with attendant undesirable waste effluent palliation. It is therefore an object of the present invention to develop groundwood formulations which are essentially free of phosphorus-containing additives, compatible with the sodium hydrosulfite bleaching agent.

In addition to the aforementioned, traces of extraneous heavy metals, e.g., ferric ions in a groundwood bleach system are suspected of causing two major problems which seriously affect the brightness gain in a given pulp bleaching operation. First, the groundwood pulp acts as a low capacity cationic exchanger with a great affinity for heavy metals such as iron, which in turn produces colored compounds in the pulp. A brightness reversion is likely also to develop upon storage of bleached pulp, thus calling for increased quantity of the bleaching agent in the first instance. Secondly, it is strongly suspected that metal ions in the bleaching system catalyze the decomposition of the hydrosulfite. The overall effect leads to increased consumption of sodium hydrosulfite to obtain a given pulp brightness. In addition, the paper manufactured in the presence of heavy metal ions shows large losses in brightness during storage. To overcome such detrimental effects on the pulp bleaching, chelating agents such as sodium tripolyphosphate, trisodium nitrilotriacetate (NTA), and trisodium ethylenediaminetetraacetate (EDTA) have been widely employed to tie-up the metal ions. The addition of the known chelating agents results in a paper brightness during storage and shipment, and reduces corrosion of the bleaching system caused by the greater accumulation of by-products in the white water.

The greater popularity of the phosphates, in addition to economic factors, can probably be attributed to their multi-functional properties: chelation ability, alkalinity, buffer capacity, and soil deflocculation. Today, these additives have come into disfavor because they are suspected of supplying vital nutrients in the above described eutrophication process.

Known references include the following:

(A) V. Lamberti, Can. 83,647 (1970).
(B) V. N. Gupta and D. B. Mutton, *Pulp and Paper Magazine of Canada*, T174, pp. 77–84, June 6, 1969.
(C) *Chemical Week*, pp. 15–16, Mar. 3, 1971.

DESCRIPTION OF THE PREFERRED EMBODIMENTS

The alkali metal salts of diglycolic acid, which are nitrogen and phosphorus-free, have been found to be especially adequate chelating agents for groundwood pulp bleaching with sodium hydrosulfite. Disodium diglycolate, for example, has a calcium sequestering power which is stronger than sodium citrate on a weight basis and a weaker power than either EDTA or NTA. The natural pH ranges of the various industrial bleaching systems are not altered to accommodate the introduction of the diglycolates herein.

As recorded in Table I hereinafter, groundwood pulp can be bleached 0.3 to 0.6 of a point greater by the addition of disodium diglycolate in sodium hydrosulfite bleaching. If 50 p.p.m. iron are added to the system before bleaching, the brightness gain increases to 1.1 to 1.2 points above the gain obtained in a system without disodium diglycolate. Similarly, with iron at the same concentration, the dipotassium salt provides an increase of 0.7 to 1.0 points brightness gain and the diammonium salt +0.6 point.

If the chelating ability of phosphates were rated as 1.0 and trisodium nitriloacetate as 1.5, then disodium diglycolate would have a chelating ability rating of approximately 1.25. This suggests that disodium diglycolate would not be strong enough as a chelator to carry heavy metals across the placenta into the fetus, the problem that has led to the ban of trisodium nitrilotriaccetate in detergents. In addition, disodium diglycolate or dipotassium diglycolate, each lacking the primary plant nutrients of nitrogen and phosphorus, are helpful in decreasing eutrophication, while the ammonium salt of diglycolic acid, discussed hereinafter, at least is phosphorus-free.

In the preferred process an aqueous mixture containing 3.25% groundwood pulp is blended, to which is added a specified weight of the diglycolate on a pulp basis as a 1% diglycolate solution. Immediately afterwards, the sodium hydrosulfite is added as a 1% solution. On a weight basis, as the bleaching agent sodium hydrosulfite may vary at three (3) to fifty (50) pounds per ton of pulp, so the weight of diglycolate salts may vary at from one (1) to ten (10) pounds per ton of pulp. It is not intended, however, to limit the invention to consecutive additions since the diglycolate could be added in solution simultaneously with the sodium solution or it could be added as a part of the sodium hydrosulfite solution itself.

Preferably the pulp system should be maintained at approximately 125° F. to 140° F., but temperatures varying from 90° F. to 170° F. are frequently encountered in industry. Similar ranges would apply in this disclosure. In addition, the natural pH of the system would be employed for the bleaching operation, using sodium hydrosulfite in the presence of the diglycolates, but it is preferred to adjust the pH to 4.5 before preparing a handsheet in the laboratory in order to obtain more comparable data. In industry, the pH varies between 4.1 and 6.3 with a preference during the bleach of approximately 5.0 to 5.6.

EXAMPLE

A sample of Great Northern groundwood pulp was bleached at 140° F. for 60 minutes with 20.0 lbs. of sodium hydrosulfite per ton of pulp (O.D.). The pulp consistency was 3.25%. The effects of the diglycolate salts were determined on a system with untreated bleach water and on a system into which 50 p.p.m. $Fe^{+III}$ were added. In the untreated system, disodium diglycolate was added at 5 and 10 lbs. per ton of pulp (O.D.) and compared against a bleach with no additive. As noted in Table I, the additive produced a brightness increase of 0.3 to 0.6 points.

In a similar comparison, with the exception that 50 p.p.m. $Fe^{+III}$ was added to the bleach water.

(A) disodium diglycolate provided brightness gains of 1.1 to 1.2 points above the standard.
(B) dipotassium diglycolate, under identical bleaching conditions, contributed an increase of 0.7 to 1.0 point brightness gain.

Results for the diammonium salt were scattered, showing a negative effect at one level, but a gain of 0.6 point at the higher additive concentration level.

The following Table I records actual tests conducted under the respective control and treated bleaching systems.

TABLE I

Sodium hydrosulfite bleaches [1] with disodium, dipotassium and diammonium salts of diglycolic acid

| Run number | Aux. agent | Aux. agent (wt. added)[2] | $Fe^{+III}$ (p.p.m.)[3] | Brightness gain (Percent MgO) | Points above untreated pulp |
|---|---|---|---|---|---|
| 787-152 | None | None | None | 8.0 | |
|  | SODA [4] | 5.0 | None | 8.8 | +0.3 |
|  | SODA [4] | 10.0 | None | 8.6 | +0.6 |
| 787-156 | None | None | 50 | 10.2 | |
|  | SODA [4] | 5.0 | 50 | 11.3 | +1.1 |
|  | SODA [4] | 10.0 | 50 | 11.4 | +1.2 |
| 787-171 | None | None | 50 | 9.7 | |
|  | KODA [5] | 5.0 | 50 | 10.4 | +0.7 |
|  | KODA [5] | 10.0 | 50 | 10.7 | +1.0 |
|  | AODA [6] | 5.0 | 50 | 9.1 | −0.6 |
|  | AODA [6] | 10.0 | 50 | 10.3 | +0.6 |

[1] Bleached groundwood pulp with 20 lbs. of $Na_2S_2O_4$/ton of pulp at 140° F. for 60 minutes at 3.25% consistency.
[2] Weight in lbs. of auxiliary agent added/ton of pulp.
[3] Bleach water treated with 50 p.p.m. $Fe^{+III}$ as $FeCl_3$.
[4] Disodium diglcolate.
[5] Dipotassium diglycolate.
[6] Diammonium diglycolate.

The following laboratory step-by-step procedure was undertaken to establish the recorded results of Table I:

First, determine the moisture of the groundwood pulp sample. Then, weigh out sufficient pulp to provide 12 grams on a dry pulp basis per bleach, adding sufficient water to make a heterogeneous mixture of 3.25% pulp. Blend the mixture for 10–15 seconds using a Waring blender. Filter the blended pulp through a 100 mesh screen and weigh the filter pad. Divide the pad of pulp into equal portions and place in a 500 ml. Erlemeyer flask. Add the filtrate equally to each flask and then add additional make-up water to provide a total weight of 370 grams of mixture per flask. De-aerate the pulp in the flask with a vacuum pump and place under an inert atmosphere.

While maintaing an inert atmosphere, add the auxillary agent (e.g., disodium diglycolate) as a 1% solution. Maintain the nitrogen purge over the bleaching flask for a period of two minutes and then add a specified volume of 1% sodium hydrosulfide solution. Stir for 30 seconds while adding the solution.

Without exposing the treated pulp to air, remove the bleaching flask from the bleaching rig and stopper. Place the flask and its contents in a constant temperature bath set at the desired bleaching temperature.

At the conclusion of the bleaching period, adjust the pH of the pulp system to 4.5 and form a handsheet. Oven dry the handsheet and determine the brightness. Compare the brightness of the bleached handsheet against the handsheet formed from the non-treated pulp sample. The difference represents the brightness increase.

We claim:
1. A method of groundwood pulp bleaching comprising the steps of:
   A. preparing a groundwood pulp water slurry of a consistency which is less than 5% and agitating said slurry;
   B. adding to the groundwood pulp water slurry a bleach water solution comprising in relative parts by weight additives as follows: sodium hydrosulfite at 3.0 to 50.0 lbs. per ton of pulp and 1.0 —10.0 lbs. per ton of pulp of salts of diglycolic acid from the group consisting of disodium, dipotassium and diammonium salts thereof;
   C. maintaing the pH of the pulp slurry at 4.1 to 6.3 while sustaining the temperature thereof within the range of 90° F. to 170° F.

2. The method according to Claim 1 wherein the salt comprises disodium diglycolate.
3. The method according to Claim 1 wherein the salt comprises dipotassium diglycolate.
4. The method according to Claim 1 wherein the salt comprises diammonium diglycolate.

References Cited

UNITED STATES PATENTS

| 3,709,779 | 1/1973 | Gupta | 162—71 |
| 2,707,145 | 4/1955 | Sparrow et al. | 162—71 |
| 3,467,574 | 9/1969 | West | 162—71 X |
| 2,826,478 | 3/1958 | Schucker | 162—71 |

FOREIGN PATENTS

| 853,647 | 10/1970 | Canada | 252—Dig. 11 |

OTHER REFERENCES

Gupta et al., *Pulp & Paper Magazine of Canada*, June 6, 1969, pp. 77–84.

*Chemical Week*, Mar. 3, 1971, pp. 15 and 16.

S. LEON BASHORE, Primary Examiner

A. L. CORBIN, Assistant Examiner

U.S. Cl. X.R.

162—72, 76